3,218,253
SEWAGE TREATMENT PROCESS
Edgar W. Clarke, Laurel Springs, N.J., and Robert E. White, Newtown Square, Pa., assignors to Villanova University, Villanova, Pa.
Filed Dec. 4, 1962, Ser. No. 242,172
5 Claims. (Cl. 210—27)

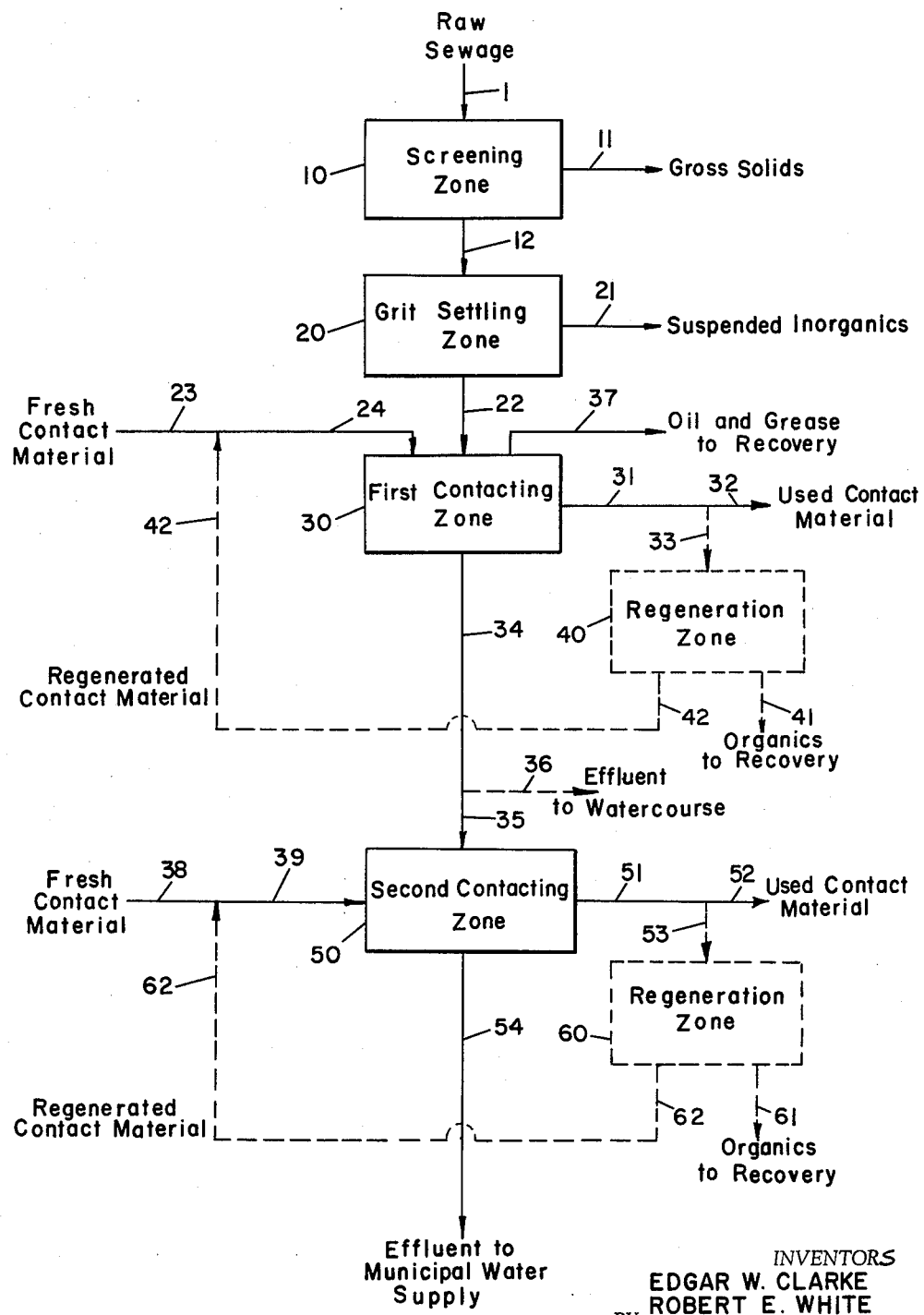

This invention relates to the separation of dissolved and suspended organic matter from dilute aqueous systems containing such impurities, and, specifically, to the separation of such substances from municipal sewage. More particularly, this invention is directed to an improved process or processes for the treatment of municipal sewage.

Municipal sewage consists of aqueous discharges from laundries, bathrooms and kitchens, and also of waste waters from a variety of industrial establishments. Thus, municipal sewage is essentially a dilute aqueous system containing a very complex assortment of organic and inorganic matter in many physical forms. These physical forms include large and small particles of solid matter floating and in suspension, colloidally dispersed matter, and matter in true solution. The liquid content of municipal sewage is very high, normally 99.97 percent by weight or more, which means that the total solid matter constitutes 0.03 percent or less. Municipal sewage also contains a variety of living matter, especially bacteria, some of which may be pathogenic.

For the purpose of planning the treatment of municipal sewage, its so-called "quality" or "strength" is conventionally determined by a number of standard tests or chemical analyses. Two of the most fundamental and significant tests are (1) the determination of the amount of suspended solids in the sewage, and (2) the determination of the total amount of organic matter, both suspended and dissolved, present in the sewage. These two determinations permit an estimation of the type and degree of treatment needed for a particular raw municipal sewage, an appraisal of the performance of the treatment selected, and an assessment of the quality of the final sewage effluent from that treatment. A number of other analytical determinations are also useful for supplementing the information provided by the two fundamental determinations mentioned above. Details concerning the conventional, or standard, procedures for carrying out all of these determinations are to be found in "Standard Methods for the Examination of Water, Sewage and Industrial Wastes," published by the American Public Health Association (Tenth Edition—1955). Conventionally, the total amount of biologically-oxidizable organic matter present in a municipal sewage is determined by the biochemical test known as the "Biochemical Oxygen Demand" (B.O.D.) test. This test depends upon the activities of bacteria which, in the presence of oxygen, feed upon and consume organic matter. The test actually determines the amount of oxygen taken up by a measured sample of sewage, after dilution with an aerated water containing a nutrient for the bacteria, when that sample is incubated at a standard temperature for a fixed number of days, conventionally five. The results of both the B.O.D. test and the suspended solids determination are expressed in terms of parts of oxygen or suspended solids, respectively, per million parts of sewage, on a weight basis. The term parts per million is abbreviated "p.p.m." It is not uncommon for a raw municipal sewage to contain as much as 400 p.p.m. of suspended solids, and to have a five-day B.O.D. of as much as 600 p.p.m.

The conventional treatment of municipal sewage involves the preliminary removal of large (i.e., "gross") solids, commonly by passing the raw sewage through a screening arrangement. Afterwards, grit and other mineral and inorganic settleable solids are customarily removed by passing the screened raw sewage, at carefully controlled velocities, through sedimentation tanks designed to drop out such impurities. Grease and oil can be removed from the raw sewage by a top skimming operation, often carried out in conjunction with the bottom skimming, or settling step, which removes the grit. The raw sewage from which gross solids, grit and grease and oil have been removed is now subjected to primary sedimentation, in order to remove a substantial proportion of the suspended organic solids. The primary sedimentation step results in a significant reduction in the strength, or quality, of the sewage, since the suspended solids so removed constitute a significant proportion of the organic matter present in the sewage. Following primary sedimentation, the sewage is subjected to an aerobic biological treatment which is intended to remove the dissolved organic matter as well as any remaining suspended organic matter. This aerobic biological treatment consists in subjecting the sewage to one or a combination, of two specific treatments, namely, (1) passing the settled sewage through so-called percolating filters containing well-graded media wherein the sewage is subjected to the action of bacteria and other microorganisms in the presence of sufficient air, and/or (2) aerating a mixture of settled sewage and a special, bacteriologically-active sludge. The latter process is the so-called "activated sludge process." Following the aerobic biological treatment, any additional solids introduced by passage through the percolating filters, or by the activated sludge process, are removed by further settling. Prior to returning the sewage effluent to the watercourse, it may be further purified (i.e., "polished") by various means such as mechanical flocculation, micro-strainers, etc.

The primary sedimentation step, efficiently operated, can remove from raw municipal sewage up to 90 percent of the suspended solids originally present, and can reduce the five-day B.O.D. by as much as 40 percent. Subsequent aerobic biological purification, also efficiently operated, can reduce the original B.O.D. of the raw sewage by as much as a total of 98 percent. However, such performances are never attained in practice by conventional treatment methods and plants. Thus, the three sewage treatment plants which handle all of the sewage for the City of Philadelphia in 1960 operated with a 69 percent overall average removal of suspended solids, and a 54 percent overall average reduction in five-day B.O.D. The most efficient of these three plants, the Northeast Sewage Treatment Works, operated during 1960 with an average removal of 81 percent of the suspended solids, and an average reduction of 71 percent in B.O.D.

The dissolved and suspended organic matter which is permitted to remain in the sewage effluent when it is returned to a watercourse constitutes a serious contaminating influence on that watercourse. This situation emphasizes a need for improving the efficiency of practical sewage treatment processes, and on an economical basis. A further factor compelling the development of a more efficient and economical sewage treatment process is the present prospect of a growing shortage of fresh water, making it highly desirable that some means be devised by which the water contained in municipal sewage can be purified and reused as often as is necessary.

In view of the foregoing, it is a principal object of this invention to provide a novel process for the treatment of municipal sewage, representing a significant and substantial improvement over any sewage treatment processes heretofore available. In particular, it is an object of this invention to provide a simple and economical sewage treatment process which, when practiced in its initial part, produces a sewage effluent for return to the watercourse of much higher purity than heretofore obtainable, and which, when practiced in its entirety, produces an effluent suitable for adding to the intake of a municipal drinking water suply treatment plant. It is a further object of this invention to provide a novel sewage treatment process which will permit the economical recovery, in useable form, of the organic matter present in municipal sewage. These and other objects and benefits of this invention will become more readily apparent from the following description of the invention, to be read in conjunction with the accompanying drawing which is a block flow diagram schematically illustrating an improved sewage treatment process embodying the present invention. The drawing illustrates how the process of this invention can be practiced to the point of returning a sewage effluent of substantially improved purity to a watercourse, or, alternatively, can be practiced to the point of producing an effluent of sufficient purity for addition to the intake of a municipal drinking water supply treatment plant.

In accordance with the practice of this invention, raw municipal sewage is first subjected to conventional screening and settling treatment for removing gross solids and grit and other inorganic and mineral solids. Following this conventional treatment, the screened and settled raw sewage is then subjected to an intimate first contacting, under specified conditions, with a selected and preferably specially-treated clay composition herein termed a "first contact material." This first contacting causes a release of any occluded oil and grease, permitting them to be removed by top skimming. Where the raw sewage contains detergents, such as alkyl benzene sulfonate, these too are removed to an appreciable extent (i.e., to a level of less than 0.3 p.p.m.) by the first contacting. After this first contacting, the first contact material and the sewage effluent are separated by any convenient means. The sewage effluent at this stage of the process is sufficiently pure to be returned immediately, and without further treatment, to a watercourse. In the event that it is desirable to further purify the sewage effluent from the first contacting, such as for example in order to supplement the supply for a municipal drinking water treatment plant, the sewage effluent from the first contacting is subjected to a second intimate contacting, under specified conditions, with a "second contact material" consisting essentially of a mixture of two selected and, in one case, preferably specially-treated clay compositions. After sufficient contacting, and separation of the second contact material from the sewage effluent, the sewage effluent is sufficiently pure for incorporation without further treatment into the supply for a municipal drinking water system treatment plant. Either or both contact materials can be regenerated after use, and reused, and the organic material which is removed from the sewage by practice of the present invention can be recovered.

Attention is now directed to the accompanying drawing, which schematically illustrates the practice of the improved process or processes of the present invention. In the drawing, raw municipal sewage is introduced through line 1 into screening zone 10, where gross solids are removed from the sewage by conventional means and withdrawn through line 11. Screened raw sewage, from which gross solids have been removed, is withdrawn from screening zone 10 through line 12 and, if necessary, is introduced into grit settling zone 20. In zone 20, inorganic and mineral solid material, such as grit, is caused to settle out of the sewage by conventional means, and is removed through line 21. The resulting screened and settled raw sewage, from which both gross solids and grit, etc. have been removed, is withdrawn from settling zone 20 through line 22, and is in this condition the normal starting material for the improvement process of this invention. Alternatively, the conventional grit removal step can be combined, and performed simultaneously, with the first contacting step introduced by this invention. However, in the latter event, the recovery of the first contact material for reuse will be complicated by the presence of grit.

Either fresh or regenerated first contact material, or a mixture of the two, are introduced through line 24 into the first contacting zone 30, along with the screened and settled raw sewage which enters zone 30 through line 22. Fresh first contact material is made available through line 23, while regenerated first contact material is provided through line 42.

In first contacting zone 30, the screened and settled raw sewage and the first contact material are intimately contacted under either batch or continuous operation. Any suitable and convenient means for preventing settling and for providing sufficiently intimate contact between a fluid and a solid, particulate phase can be employed. For example, in batch or continuous contacting, suitable agitation can be provided in order to obtain the necessary intimacy of contact and prevent the solid phase from settling out. Likewise, baffled flow can be provided in a continuous, counter-current or co-current contacting system.

The time of first contacting in zone 30 will depend upon the efficiency of contact which has been provided. Generally, contacting for a period within the range of from about 2 to about 20 minutes will be sufficient, although longer periods may be necessary if the contacting is not particularly efficient. The temperature and pressure of the contacting are not critical, and these process variables can be maintained at whatever values are practical and convenient under the circumstances. Generally, from about 10 to about 200 parts of first contact material per million parts of sewage, on a weight basis, provide satisfactory results. However, an amount of first contact material within the range of from about 30 to about 100 parts per million (p.p.m.) provides better results and is distinctly preferred.

After contacting, any suitable and conventional means for separating the contacted mixture of sewage and first contact material can be employed. Thus, in a batch operation, it will be convenient simply to allow the mixture of sewage and first contact material to settle in a quiescent state for a sufficient period of time, in order to allow the solid materials to settle. After settling, the clear first sewage effluent, herein also termed the first treated sewage, can be separated by any convenient means, such as by decantation. Normally, settling for a period of from about five to about fifteen minutes is sufficient to provide a suitably clear first sewage effluent. In continuous operation of the first contacting step, either counter-current or co-current, other suitable and conventional means can be utilized to effect a satisfactory separation of the first treated sewage and the used first contact material.

Any oil and grease released during the first contacting are removed, by top skimming, through line 37. The separated, used first contact material is shown as being removed from contacting zone 30 through line 31, and it can then either be discarded through line 32, or it can be introduced through line 33 into regeneration zone 40. In the regeneration zone 40, the used first contact material is subjected to treatment with a suitable solvent, in order to remove the organic material. After such solvent treatment, the contact material is subjected to a high temperature in the range of from about 600 to about 900 degrees F., in the presence of air or oxygen, and is then suitable for reuse. The regenerated first contact material is shown as being removed from the regeneration zone 40 through line 42, and it can then be reintroduced alone, or it can be blended with fresh first contact material introduced through line 23, in either case for admission to first contacting zone 30 through line 24. The organic material picked up by the solvent in the regeneration zone 40 can be separated from such solvent by conventional means, such as by distillation, and the unseparated organics are shown as being removed from zone 40 through line 41 for subsequent separation in a recovery zone (not shown).

The first sewage effluent removed from the first contacting zone 30 through line 34 is sufficiently pure for immediate return to a watercourse without further treatment, as through line 36. However, in the event that further purification is desired, the first sewage effluent can be introduced into a second contacting zone 50 through line 35. Either fresh or regenerated second contact material, or a mixture of the two, is introduced into zone 50 through line 39, the fresh second contact material being brought in by line 38 and the regenerated second contact material being added through line 62.

In second contacting zone 50, the first sewage effluent and the second contact material are brought into sufficiently intimate contact for a suitable period of time. Generally, the contact time will depend upon the degree of intimacy of the contact, the time periods in the range of from about 2 to about 20 minutes being normally productive of satisfactory results. However, longer periods may be required if the contacting is not particularly efficient. As with the first contacting step, the temperature and pressure at which the second contacting are carried out are not critical, and those variables may be maintained at any convenient and practical values under the circumstances.

The amount of second contact material to be employed for satisfactory results will normally fall within the range of from about 100 to about 900 parts per million (p.p.m.) on a weight basis. However, amounts in the range of from about 200 to about 500 parts per million generally give better results and are distinctly preferred.

As with the first contacting, the second contacting can be effected by any convenient and conventional means. Thus, the contact can be batch-wise or continuous and, in the latter case, can be either counter-current or co-current. It is particularly advantageous to carry out this second contacting on a continuous, counter-current basis, such as in a vertical tower, with the first sewage effluent being introduced at a point near the bottom of the tower and the second contact material being introduced at a point near the top of the tower. Satisfactory separation of the fluid sewage stream from the solid contact material can be effected by employing well-known tower design techniques.

The used second contact material is withdrawn from zone 50 through line 51, and can either be discarded through line 52 or introduced through line 53 into regeneration zone 60. In the latter zone, the used second contact material can be treated with solvent to remove the organic matter, and the second contact material can then be burned in the presence of air or oxygen as described hereinabove with reference to the used first contact material. Regenerated second contact material is removed from zone 60 through line 62 for possible reuse, either alone or in admixture with fresh second contact material added through line 38. The organic matter removed by the solvent in zone 60 is removed from zone 60 through line 61, and can be separated from the solvent and recovered, by conventional means such as distillation, in a subsequent recovery zone (not shown). Second sewage effluent is removed from zone 50 through line 54 and, as removed, is sufficiently pure for introduction without further treatment into the supply of a municipal drinking water system treatment plant.

The solid, particulate material with which the sewage is first contacted (herein termed the "first contact material") consists essentially of a clay composition of the kaolinite type, in a particular physical form. By use of the term "clay composition of the kaolinite type" is meant a clay composition in which the clayey mineral is predominately crystalline kaolinite, i.e., $$Al_2O_3 \cdot 2SiO_2 \cdot 2H_2O$$

accompanied by a relatively small amount of other constituents. Thus, in an ultimate analysis of such a clay composition, i.e., in an analysis in which the various constituents are reported as oxides, the mole ratio of $SiO_2$ to $Al_2O_3$ will approximate 2.0. In addition to alumina ($Al_2O_3$) and silica ($SiO_2$), predominately combined in the form of the mineral kaolinite, suitable clay compositions of the kaolinite type also contain various other oxides such as those of iron, calcium, magnesium, potassium and sodium. On a moisture- and volatile-free, weight basis, a typical ultimate analysis of a suitable clay composition of the kaolinite type would be as follows: alumina ($Al_2O_3$)—45.0%; silica ($SiO_2$)—52.7% magnesium oxide (MgO)—nil; iron oxide ($Fe_2O_3$)—0.4%; calcium oxide (CaO)—0.1%; and other—1.8%. The mole ratio of silica to alumina in this typical clay composition of a kaolinite type is 1.99.

A clay composition of the kaolinite type which is suitable for use in the present invention as the first contact material must also be constituted of flat, plate-like, hexagonal crystals, having a particle size distribution within the range of from about 0.2 micron to about 3 microns (equivalent spherical diameters). A suitable clay composition will also have a specific gravity of approximately 2.6, and usually within the range of from about 2.58 to about 2.62. Preferably, for use in accordance with the present invention, the particulate first contact material should be suitably modified, by surface treatment, to provide it with cationic, surfactant, hydrophobic and organophilic properties. Suitable surface-modified clay compositions of the kaolinite type and their method of preparation are the subject of U.S. Patent No. 2,948,632.

The solid, particulate material with which the first treated sewage, or first sewage effluent, can be contacted in order to further purify it (herein termed the "second contact material") consists essentially of a physical mixture of from 30 to 70 weight percent of a suitable clay composition of the kaolinite type, and from 30 to 70 weight percent of a suitable clay composition of the attapulgite type. As described above, a "clay composition of the kaolinite type" is one having for its predominant clayey constituent, mineral crystalline kaolinite, i.e., $Al_2O_3 \cdot 2SiO_2 \cdot 2H_2O$. Clay compositions of the kaolinite type which are suitable for use as one of the two components of the second contact material have ultimate analyses and particulate forms exactly similar to such of those kaolinite-type clay compositions as are suitably employed as the first contact material. However, in order to be useful as a component of the second contact material, otherwise-suitable clay compositions of the kaolinite type must have a particle size distribution within the range of from about 0.2 micron to about 25 microns (equivalent spherical diameters). Preferably, the selected clay composition of the kaolinite type will also have been modified, by suitable surface treatment, to provide it with cationic, surfactant, hydrophobic and organophilic properties. As noted hereinbefore, suitable surface modified clay compositions of the kaolinite type and their method of preparation are the subject of U.S. Patent No. 2,948,632.

By use of the term "clay composition of the attapulgite type" is meant a clay containing silica and alumina in a mole ratio in the range of from about 7.0 to about 7.5, and also containing significant amounts of magnesium oxide and iron oxides. Thus, a typical ultimate analysis of a suitable clay composition of the attapulgite type will be as follows: silica ($SiO_2$)—74.0%; alumina ($Al_2O_3$)—17.5%; magnesium oxide (MgO)—4.5%; iron oxide ($Fe_2O_3$)—1.4%; calcium oxide (CaO)—nil; and other 2.6%. Such a typical composition will have a mole ratio of silica to alumina of 7.16.

Clay compositions of the attapulgite type which are suitable for use as a component of the second contact material of this invention must also be constituted of needle-like, or fibrous, crystalline particles, and must have a particle-size distribution within the range of from about 0.2 micron to about 400 microns (equivalent spherical diameters). Such a clay composition typically will also have a specific gravity of approximately 2.65, or usually within the range of from about 2.63 to about 2.67.

The first and second contact materials employed in the practice of this invention can be regenerated after use by a combination of solvent treatment and burning in air. Solvents suitable for this purpose include primene and carbon tetrachloride. Primene is defined as a tertiary alkyl primary aliphatic amine with alky chain consisting of a mixture of branch isomers varying from 11 to 14 carbon atoms. In practice, the used contact material is treated with solvent in an amount within the range of from about 50 to about 100 parts of solvent per 100 parts of the contact material, on a weight basis. Solvent treatment is preferably carried out for a period of from about 2 to about 20 minutes.

After treatment, the solvent containing the dissolved organic matter is separated by conventional means from the treated contact material, and the latter subjected to burning in air at a temperature in the range of from about 600° F. to about 900° F., and preferably within the range of from about 700° F. to about 800° F. The burned contact material is then suitable for reuse in the process of this invention. The solvent containing the dissolved organics can be subjected to further treatment whereby the solvent and organics are conventionally separated, and the organics recovered in useable condition.

In order to provide a specific embodiment illustrating practice of the initial part of the process of this invention, in which raw municipal sewage is subjected to only a first contacting with a first contact material, samples of raw municipal sewage were obtained from the Northeast Sewage Treatment Works of the city of Philadelphia in Pennsylvania. The quality, or strength, of these samples varied, depending upon when they were taken. However, in all cases, the samples were taken after conventional screening techniques had removed gross solids, and after conventional settling techniques had removed grit and other mineral and inorganic solids.

The so-called first contact material employed in all of the following experiments was a clay composition of the kaolinite type, composed of flat, plate-like, hexagonally-shaped crystals. This first contact material had a particle size distribution extending over the range of from about 0.2 microns to about 3 microns, and an average particle size of approximately 0.55 micron, all in equivalent spherical diameters. Also, this clay composition had a specific gravity of approximately 2.58, a pH of 6.1 to 6.5 and, in addition, had been modified by surface treatment according to the teachings of U.S. Patent No. 2,948,632 in order to impart cationic, surfactant, hydrophobic and organophilic properties. The particular clay composition employed as the contact material in the following examples is available commercially, and was obtained from the Minerals & Chemicals Corporation of America, under their product designation ASP–105.

All of the following experiments were carried out by contacting the screened and settled raw sewage with first contact material in a batch-type operation. In each case, the sewage sample was mixed with the hereinafter-specified amount of contact material and subjected to vigorous agitation for a period of approximately ten minutes. After such contacting, the mixture of sewage and contact material was permitted to stand in a quiescent state for approximately ten minutes. Oil and grease present in the raw sewage sample settled out at the top of the mixture, while the solid, particulate contact material containing the removed organic matter settled out at the bottom of the mixture, allowing these phases to be removed by top and bottom skimming, respectively. Substantially clear first sewage effluent was then removed by decanting from a point intermediate the top and bottom of the mixture. A summary of the obtained results is presented in the following Table I. In this table, the quantity of fresh first contact material employed is expressed in terms of parts of contact material per million parts of raw sewage treated, on a weight basis.

*Table I*

| | Contact material dosage, p.p.m. | Total bacteria count, per 100 ml. | Coliform bacilli count, per 100 ml. | 5-day B.O.D., p.p.m. | Suspended solids, p.p.m. |
|---|---|---|---|---|---|
| Raw sewage | | 1,160,000 | 267,000 | 340 | 323 |
| Effluent | 50 | 1,600 | 320 | 30 | nil |
| Do | 100 | 1,000 | 210 | 19 | nil |
| Raw sewage | | 4,895,000 | 1,245,000 | 245 | |
| Effluent | 100 | 9,450 | 1,890 | 23 | nil |
| Raw sewage | | 15,840,000 | 7,800,700 | 398 | |
| Effluent | 200 | 7,800 | 1,300 | 6 | nil |

The results presented in Table I demonstrate that practice of only the initial part of the process of this invention brings about reductions of better than 99 percent in the total bacteria count and coliform bacilli count, a reduction of better than 90 percent in the 5-day B.O.D., and a complete removal of suspended solids, from the screened and settled raw sewage samples treated in accordance with the invention.

In order to provide a specific embodiment illustrating practice of the process of this invention in its entirety, another sample of raw municipal sewage was obtained from the Northeast Sewage Treatment Works of the city of Philadelphia in Pennsylvania. Again, this sample was taken after the sewage had been subjected to conventional screening techniques to remove gross solids, and to conventional settling techniques to remove grit and other inorganic and mineral solids.

The first contact material employed in the following experiment was identical to that employed in the experiments whose results are set forth in above Table I. The second contact material, employed in the second contacting of the screened and settled raw sewage, was an equal weight mixture consisting essentially of 50 weight percent of a suitable clay composition of the kaolinite type and 50 weight percent of a suitable clay composition of the attapulgite type. The kaolinite-type clay composition forming one component of this mixture had a flat, plate-like hexagonally-shaped, crystalline form, a particle size distribution extending over the range of from about 0.2 micron to about 25 microns, and an average particle size of approximately 4.8 microns (particle sizes in equivalent spherical diameters). In addition, this kaolinite-type clay composition had a refractive index of approximately 1.56, a specific gravity of approximately 2.58, and a pH in the range of from about 6.1 to about 6.5. It also had been modified, by surface treatment according to the teachings of U.S. Patent No. 2,948,632, to provide it with cationic, surfactant, hydrophobic and organophilic properties. The attapulgite-type clay composition which formed the second component of the mixture constituting the second contact material had a needle-like, or fibrous, crystalline form, a particle-size distribution extending substantially within the range of from about 0.2 micron to about 400 microns, and an average particle size of approximately 52 microns (particle sizes in equivalent spherical diameters). In addition, this attapulgite-type clay composition had a specific gravity of approximately 2.65. The kaolinite-type clay composition is commercially available and was obtained from the Minerals & Chemicals Corporation of America under their product designation, ASP–405. The attapulgite-type clay composition is also commercially available and was obtained from the Filtrol Corporation, under their product designation, F–58.

In carrying out the experiment, the first contacting was performed by mixing 100 parts of the first contact material with one million parts of the screened and settled raw sewage, on a weight basis. This mixture was then agitated for a period of approximately ten minutes, after which it was allowed to stand in the quiescent state for another period of approximately ten minutes. Oil and grease which settled out on top of the mixture, and grit and other inorganic and mineral solids which settled out at the bottom of the mixture, were removed by top and bottom skimming, respectively. A substantially clear first treated sewage (i.e., first sewage effluent) was then removed by decantation from a point intermediate the top and bottom of the contacted mixture.

This first treated sewage was then continuously introduced into a vertical, cylindrical tower at a point near the bottom, and the second contact material was introduced at a point near the top of the tower in an amount equivalent to approximately 200 parts of second contact material per one million parts of first treated sewage, on a weight basis. Contact time in the tower was approximately 6.5 minutes. Temperature and pressure were ambient atmospheric. The used second contact material was continuously removed from a point adjacent the bottom of the tower, while a substantially clear second treated sewage (i.e., a second sewage effluent) was continuously removed from a point adjacent the top of the tower. The results of this experiment are set forth in the following Table II.

*Table II*

|  | Total bacteria count, per 100 ml. | Coliform bacilli count, per 100 ml. | 5-day B.O.D., p.p.m. | Suspended solids, p.p.m. |
| --- | --- | --- | --- | --- |
| Raw sewage | 8,755,000 | 1,210,000 | 212 | 200 |
| Effluent | 1,940 | 0 | 20 | nil |

As can be seen from the data of the foregoing Table II, practice of the process of this invention in its entirety produces a reduction in the total bacteria count of better than 99 percent, a reduction in B.O.D. of better than 90 percent and complete removal of the coliform bacilli and suspended solids. In view of the complete removal of the coliform bacilli, the second sewage effluent, or second treated sewage, is suitable for direct introduction into the intake of a municipal drinking water supply treatment plant.

While the process of processes of this invention have been particularly described with reference to their use in the treatment of raw municipal sewage, it should be apparent from the foregoing description that the described process operations are also inherently suitable for the treatment of sewage streams in any stage of conventional processing. Thus, it is to be understood that this invention comprehends the treatment of any sewage stream, including raw sewage, with the herein-disclosed contact materials in order to effect a removal of dissolved and suspended organic matter.

The invention claimed is:

1. A process for the treatment of sewage which comprises: (1) intimately contacting for a period of approximately 10 minutes screened raw sewage with approximately 50 p.p.m. of a contact material consisting essentially of a cationic, surfactant, hydrophobic and organophilic clay composition of the kaolinite type is plate-like crystalline form having a particle size distribution within the range of from about 0.2 micron to about 3 microns and an average particle size of 0.55 micron, all in equivalent spherical diameters, and having a refractive index of approximately 1.56, a specific gravity of approximately 2.58, and a pH within the range of from about 6.1 to about 6.5; (2) allowing the contacted mixture of sewage and contacting material to settle in the quiescent state for a period of approximately 10 minutes; and (3) decanting off at a point intermediate the top and the bottom of the settled mixture a treated sewage having a reduced biochemical oxygen demand and a reduced content of suspended solids.

2. A process for the treatment of sewage which comprises: (1) intimately contacting for a period of from about 2 to about 20 minutes screened raw sewage with from about 15 to about 200 p.p.m. of a first contact material consisting essentially of a cationic, surfactant, hydrophobic and organophilic clay composition of the kaolinite type in plate-like crystalline form having a particle size distribution within the range of from about 0.2 micron to about 3 microns in equivalent spherical diameter, and a pH in the range of from about 6.1 to about 6.5; (2) substantially separating from said first contact material a first treated sewage having a reduced biochemical oxygen demand and a reduced content of suspended solids; (3) intimately contacting for a period of from about 2 to about 20 minutes said first treated sewage with from about 100 to about 600 p.p.m. of a second contact material consisting essentially of a mixture of (A) 30 to 70 weight percent of a cationic, surfactant, hydrophobic and organophilic clay composition of the kaolinite type in plate-like crystalline form having a particle size distribution within the range of from about 0.2 micron to about 25 microns in equivalent spherical diameter and a pH in the range of from about 6.1 to about 6.5, and (B) 70 to 30 weight percent of a clay composition of the attapulgite type in needle-like crystalline form having a particle size distribution within the range of from about 0.2 micron to about 400 microns in equivalent spherical diameter; and (4) separating from said second contact material a second treated sewage having a further reduced biochemical oxygen demand and a further reduced content of suspended solids.

3. A process for the treatment of sewage which comprises: (1) intimately contacting for a period of approximately ten minutes screened raw sewage with approximately 100 p.p.m. of a first contact material consisting essentially of a cationic, surfactant, hydrophobic and organophilic clay composition of the kaolinite type in plate-like crystalline form having a particle size distribution within the range of from about 0.2 micron to about 3 microns and an average particle size of approximately 0.55 micron, all in equivalent spherical diameters, and having a refractive index of approximately 1.56, a specific gravity of approximately 2.58, and a pH within the range of from about 6.1 to about 6.5; (2) allowing the contacted mixture of sewage and first contacting material to settle in the quiescent state for a period of approximately ten minutes; (3) decanting off at a point intermediate the top and the bottom of the settled mixture a first treated sewage having a reduced biochemical oxygen demand and a reduced content of suspended solids; (4) intimately contacting for a period of approximately 6.5 minutes said first treated sewage with approximately 200 p.p.m. of a second contact material consisting essentially of a mixture of (A) approximately 50 weight percent of a cationic, surfactant, hydrophobic and organophilic clay composition of the kaolinite type in plate-like crystalline form having a particle size distribution within the range of from about 0.2 micron to about 25 microns and an average particle size of approximately 4.8 microns, all in equivalent spherical diameters, and having a refractive index of approximately 1.56, a specific gravity of approximately 2.58, and a pH within the range of from about 6.1 to about 6.5, and (B) approximately 50 weight percent of a clay composition of the attapulgite type in needle-like crystalline form having a particle size distribution within the range of from about 0.2 micron to about 400 microns and an average particle size of approximately 52 microns, all in equivalent spherical diameters, and having a specific gravity of approximately 2.65; and (5) separating from said second contact material a second treated sewage having a further reduced biochemical oxygen demand and a further reduced content of suspended solids.

4. A process for the treatment of sewage which comprises: (1) intimately contacting sewage with a particulate contact material consisting essentially of a mixture of (A) 30 to 70 weight percent of a clay composition of the kaolinite type in the form of flat, plate-like hexagonal crystals having a particle size distribution within the range of from about 0.2 micron to about 25 microns in equivalent spherical diameter, said clay composition of the kaolinite type having been subjected to surface modification to impart cationic, surfactant, hydrophobic and oganophilic properties, and (B) 70 to 30 weight percent of a clay composition of the attapulgite type in the form of needle-like crystals having a particle size distribution within the range of from about 0.2 micron to about 400 microns in equivalent spherical diameter, said contacting being carried out for such a period of time and with such an amount of contact material as are sufficient to reduce the biochemical oxygen demand and content of suspended solids of the sewage; and (2), separating from said contact material a treated sewage having a reduced biochemical oxygen demand and a reduced content of suspended solids.

5. A process for the treatment of sewage which comprises: (1) intimately contacting sewage with a particulate first contact material consisting essentially of a clay composition of the kaolinite type in the form of flat, plate-like hexagonal crystals having a particle size distribution within the range of from about 0.2 micron to about 3 microns in equivalent spherical diameter, said clay composition having been subjected to surface modification to impart cationic, surfactant, hydrophobic and organophilic properties, and said contacting being carried out for such a period of time and with such an amount of said first contact material as are sufficient to reduce the biochemical oxygen demand and content of suspended solids of the sewage; (2) substantially separating from said first contact material a first-treated sewage having a reduced biochemical oxygen demand and a reduced content of suspended solids; (3) intimately contacting said first-treated sewage with a particulate second contact material consisting essentially of a mixture of (A) 30 to 70 weight percent of a clay composition of the kaolinite type in the form of flat, plate-like hexagonal crystals having a particle size distribution within the range of from about 0.2 micron to about 25 microns in equivalent spherical diameter, said clay composition of the kaolinite type having been subjected to surface modification to impart cationic, surfactant, hydrophobic and organophilic properties, and (B) 70 to 30 weight percent of a clay composition of the attapulgite type in the form of needle-like crystals having a particle size distribution within the range of from about 0.2 micron to about 400 microns in equivalent spherical diameter, said contacting being carried out for such a period of time and with such an amount of said second contact material as are sufficient to reduce the biochemical oxygen demand and content of suspended solids of the first-treated sewage; and (4) separating from said second contact material a second-treated sewage having a further reduced biochemical oxygen demand and a further reduced content of suspended solids.

References Cited by the Examiner

UNITED STATES PATENTS

| | | | |
|---|---|---|---|
| 1,904,916 | 4/1933 | Coombs | 210—11 X |
| 2,296,523 | 9/1942 | Henry | 210—36 X |
| 2,367,384 | 1/1945 | Tymstra et al. | 210—36 |

FOREIGN PATENTS 25,119    1894    Great Britain.

OTHER REFERENCES

Chemical Materials Catalog, 12th ed., 1961, Rheinhold Publ. Co., New York, pp. 423–427.

Coogan et al.: Physical and Chemical Characteristics of Waste Water Discharges, Ind. and Eng. Chem., vol. 46, Feb. 1954, pp. 290–296.

MORRIS O. WOLK, *Primary Examiner.*